Feb. 27, 1968 R. D. LEONI 3,370,809

CONVERTIPLANE

Filed June 29, 1965 9 Sheets-Sheet 1

INVENTOR
RAY D. LEONI
BY Vernon F. Hauschild
ATTORNEY

Feb. 27, 1968 R. D. LEONI 3,370,809

CONVERTIPLANE

Filed June 29, 1965 9 Sheets-Sheet 2

INVENTOR
RAY D. LEONI

BY Vernon F. Hauschild
ATTORNEY

INVENTOR
RAY D_ LEONI
BY Vernon F. Hauschild
ATTORNEY

INVENTOR
RAY D. LEONI
BY Vernon F. Hauschild
ATTORNEY

CONVERTIPLANE

Filed June 29, 1965 9 Sheets-Sheet 5

INVENTOR
RAY D. LEONI
BY Vernon F. Hauschild
ATTORNEY

INVENTOR
RAY D. LEONI
BY Vernon F. Hauschild
ATTORNEY

INVENTOR
RAY D. LEONI
BY Vernon F. Hauschild
ATTORNEY

INVENTOR
RAY D. LEONI
BY Vernon F. Hauschild
ATTORNEY

INVENTOR
RAY D. LEONI
BY Vernon F. Hauschild
ATTORNEY

United States Patent Office 3,370,809
Patented Feb. 27, 1968

3,370,809
CONVERTIPLANE

Ray D. Leoni, Hamden, Conn., assignor to United Aircraft Corporation, East Hartford, Conn., a corporation of Delaware Filed June 29, 1965, Ser. No. 467,910
25 Claims. (Cl. 244—7)

ABSTRACT OF THE DISCLOSURE

A convertiplane operable as both a fixed wing aircraft and a helicopter including at least one gas turbine engine either driving the aircraft as a fixed wing jet with the helicopter rotor retracted or, as a hot cycle helicopter with the helicopter rotor extended and including the necessary ducting to so connect the engine to the two-blade teeter-type helicopter rotor while permitting rotor retraction.

This invention relates to aircraft and more particularly to a convertiplane which may be operated either as a helicopter or as a jet powered, fixed wing aircraft.

While helicopters offer a greater advantage in vertical take-off, hovering, low speed flight, autorotation and the ability to land and take off from virtually any terrain, the helicopter has high speed flight limitations. Conversely, the jet engine powered fixed wing aircraft is capable of efficient high speed flight, but has substantial limitations with respect to low speed flight, landing and takeoff. It is accordingly an object of this invention to teach a convertiplane which can operate either as a helicopter or as a fixed wing jet driven aircraft and wherein the helicopter rotor may be stowed within or on top of the airframe.

It is a further object of this invention to teach such a convertiplane in which a turbojet engine or engines provide exhaust gases to be discharged rearwardly from the air frame during fixed wing mode of operation and to be passed through hollow helicopter blades for hot-cycle helicopter operation during helicopter mode of operation.

It is still a further object of this invention to teach such a convertiplane wherein all of the ducting of the jet engine exhaust gases, both in fixed wing mode and helicopter mode is internal, and of controlled cross-sectional dimension.

It is still a further object of this invention to teach such a convertiplane wherein the ducting which conducts the jet engine exhaust gases to the helicopter rotor comprises a vertically extending duct and a horizontally extending duct, the latter of which can reciprocate in telescoping fashion to permit the helicopter rotor to be stowed within the airframe.

It is still a further object of this invention to teach such a convertiplane wherein yaw control during helicopter mode is achieved by exhausting jet engine gases through selectively positioned nozzles located at the rear of the airframe.

It is still a further object of this invention to teach a convertiplane having a hot cycle helicopter system of the teeter-type wherein a one-piece central blade hub with two diametrically opposed spindles projecting therefrom is supported in trunnion fashion from a rotatable rotor support member with which it is in sealing engagement and interior communication, and wherein hollow helicopter blades with selectively directed expansion or exhaust nozzles at the tips thereof are sleeved onto the spindles for pitch-change rotation thereabout and for lift rotation therewith.

It is still a further object of this invention to teach such a hot cycle helicopter rotor including at least one tension strap external to the rotor hub structure extending between and directly connecting the helicopter blades. Such a tension strap would receive no sinusodial torsional loading during cyclic pitch change of the helicopter blades and would be subjected solely to the relatively constant twist of collective pitch change.

It is still a further object of this invention to teach such a helicopter rotor system including flap locks pivotally attached to the rotor system for rotation therewith and spring biased to lock the blades and the central hub from flapping action at and below selected rotational speeds and responsive to centrifugal force to release the blades and hub for flapping action.

It is still a further object of this invention to teach such a helicopter rotor system wherein cooperating apertures exist in the blade hub and the blade support system to define a gas-flow aperture therebetween and wherein said hub aperture and support member aperture are of selected size so that the gas-flow aperture is of constant cross-sectional area.

It is still a further object of this helicopter rotor system to provide means for cooling the bearings between the blades and the hub and between the rotating support shaft and the stationary structure.

It is still a further object of this invention to teach means and the method for converting between helicopter mode and fixed wing or airplane mode in the operation of my convertiplane.

It is still a further object of this invention to teach a convertiplane wherein the helicopter rotor can be retracted and stowed in the fuselage or airframe without disconnecting any of the helicopter controls.

Other objects and advantages will be apparent from the specification and claims and from the accompanying drawings which illustrate an embodiment of the invention.

Figure 1:
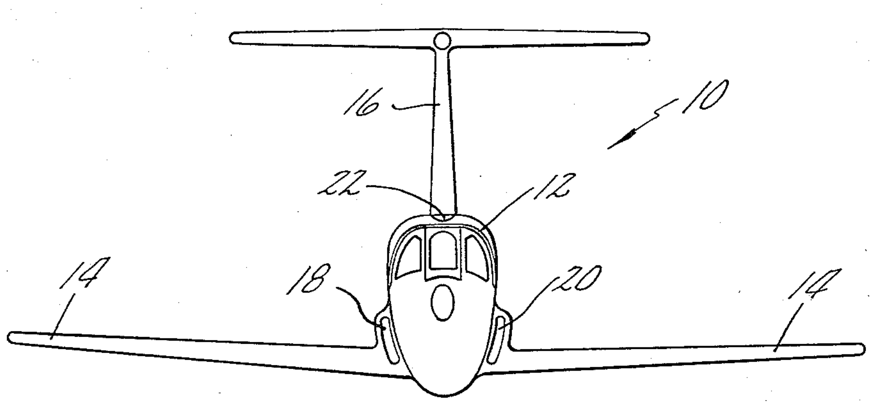
FIG. 1 is a front view of my convertiplane shown in the fixed wing or airplane mode of operation, with the landing wheels retracted and the helicopter rotor stowed.

Referring to FIG. 1 we see my convertiplane 10 in fixed wing mode of operation wherein the helicopter rotor is stowed within fuselage or airframe 12 and the convertiplane is sustained in flight by fixed wings 14. Tail section 16 projects from fuselage 12. My convertiplane 10 is powered by a conventional turbopowered jet engine and air scoops leading to the engine are shown at 18 and 20. Doors 22 may be used to cover the stowed helicopter rotor so as to cooperate with fuselage 12 in defining a smooth, aerodynamic surface.

Figure 2:
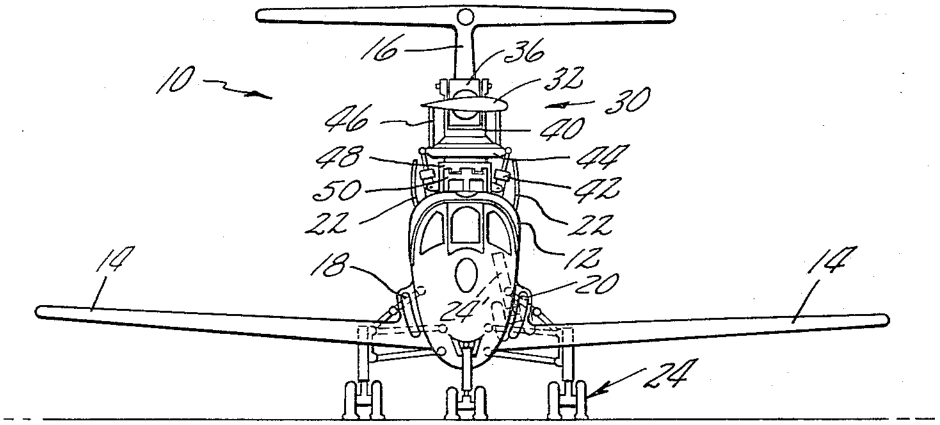
FIG. 2 is a front view of my convertiplane in the helicopter mode of operation and with the landing wheels extended.

Referring to FIG. 2, we see my convertiplane 10 in helicopter mode of operation and with tricycle-type landing gear 24 shown extended in solid lines and a portion thereof shown retracted in phantom lines at 24'. Doors 22 are opened so as to permit helicopter lift rotor 30 to project from fuselage 12. As will be described in greater particularity hereinafter, lift rotor 30 is of the hot-cycle type wherein two hollow blades 32, each having selectively directed exhaust or expansion nozzles 34 at the tips thereof, project from central blade hub 36, which is supported in teeter fashion from rotatable trunnion support member 40. Conventional control servos 42 (preferably three) position conventional swash plates 44 so as to actuate control rods 46 and thereby control the collective and cyclic pitch of blades 32. Rotor support housing 48 is supported from fuselage 12 by stowing members 50. Control servos 42, swash plates 44 and control rods 46 are of standard design and form no part of this invention so will not be described in greater particularity, but references are hereby made to U.S. Patent No. 2,774,553 and U.S. Patent No. 3,199,601, to which reference may be had for a complete description thereof.

Figure 3:
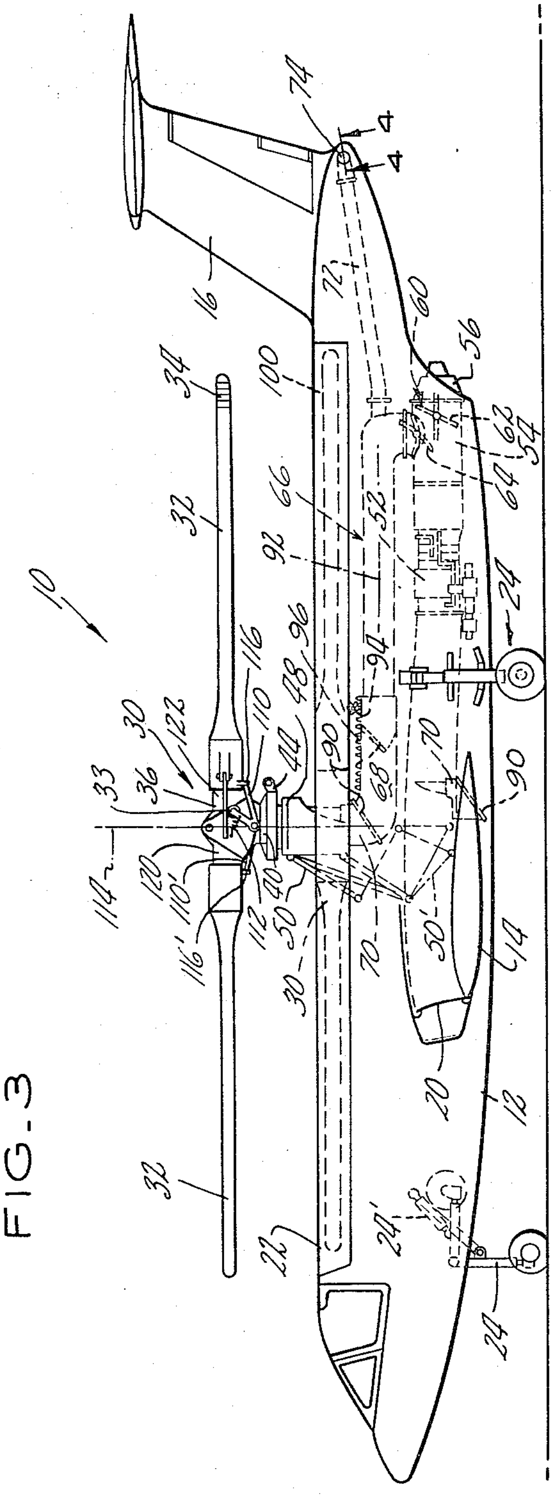
FIG. 3 is a side view of my convertiplane, partially broken away to show helicopter mode of operation with the helicopter blade in solid lines and fixed wing mode of operation with the helicopter blade in phantom lines.

Referring to FIG. 3 we see a side view of my convertiplane 10, illustrated in helicopter mode and in fixed wing mode. Aircraft turbojet engine 52 is mounted within fuselage or airframe 12 and is connected by ducting 54 so that the exhaust gases therefrom may be discharged rearwardly from fuselage 12 through exhaust nozzle 56 which may be of the variable area type fully disclosed in U.S. Patents Nos. 3,032,974 or 3,057,150. Diverter valve system 60, which consists of butterfly type diverter valves 62 and 64 are pivotally positioned within ducting 54 so that they may be actuated in unison in conventional fashion to their substantially horizontal positions shown in FIG. 3 and thereby cause all of the exhaust gases of turbojet engine 52 to be discharged rearwardly through exhaust nozzle 56 so as to generate thrust in the fixed wing mode. Diverter valve system 60, which may be of the type more fully disclosed and controlled as in U.S. Patent No. 3,147,773, may be actuated to its FIG. 3 substantially vertical positions wherein diverter valve 62 blocks flow through exhaust nozzle 56 and wherein valve 64 diverts the exhaust gases from engine 52 through duct system 66 for eventual passage through horizontal duct 68, vertical duct 70, trunnion support member 40, blade central hub 36, blades 32 and blade tip exhaust nozzle 34 to cause the rotation of lift rotor 30 during helicopter mode.

Figure 4:
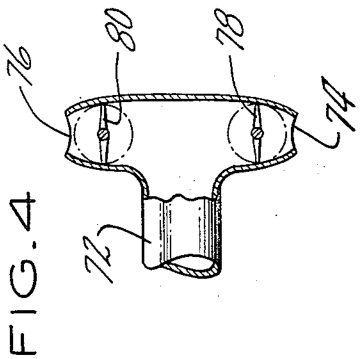
FIG. 4 is a showing along line 4—4 of FIG. 3 to show the yaw control nozzles and the control valves therein.

Duct system 72 projects from duct system 66 and conducts exhaust gases therefrom to yaw control nozzles 74 and 76, which as best shown in FIG. 4, project laterally out of fuselage 12 at the rearward end thereof so that, as exhaust gases are discharged therethrough, yaw control of convertiplane 10 is accomplished. Butterfly valves 78 and 80 are positioned adjacent yaw nozzles 74 and 76 and are actuated by the pilot to control discharge through yaw nozzles 74 and 76. Any conventional type of pilot control of valves 78 and 80 would be suitable, for example, the control mechanism taught in U.S. Patent No. 3,159,360 to which reference may be had.

Still referring to FIG. 3 it will be noted that horizontal duct 68 joins vertical duct 70 at mating flanges 90 and that horizontal duct 68 may be caused to translate along horizontal axis 92 by the action of pinion gear 94 and rack 96, the actuation of which will be described in greater particularity hereinafter. When lift rotor 30 is to be stowed into stowage compartment 100 within fuselage 12, pinion 94 and rack 96 cause horizontal ducting 68 to translate horizontally and rearwardly as shown in FIG. 3 until flange 90 assumes the rearward position. When the rotor 30 is locked in its fore-and-aft position in a manner to be described hereinafter, stowage members 50 may then be actuated to their skeleton line positions of FIG. 3 so as to cause rotor 30 to lower into stowage compartment 100 and to cause the remainder of the helicopter lift rotor mechanism 30 to be stowed within fuselage 12, as shown in phantom in FIG. 3.

Still referring to FIG. 3, it will be noted that a pair of flap locks, shown at 110 and 110', are pivotally attached to opposite sides of rotatable trunnion support member 40 so as to rotate therewith and are biased by springs such as 112 to rotate toward axis of rotation 114 when helicopter rotor 30 is stopped or rotating at a low speed so that flap locks 110 and 110' engage lugs 116 and 116' on blades 32. Since this is a two-bladed rotor and since blades 32 are sleeved onto central hub 36, and since central hub 36 is positioned in trunnion support member 40 in teeter fashion, it will be realized that the action of the two flap locks 110 and 110' lock both blades 32 and central hub 36 from flapping with respect to trunnion support member 40. When rotor 30 rotates above a preselected speed or r.p.m., flyballs such as 33 cause locks 110 and 110' to rotate free of lugs 116 and 116' to permit blades 32 and hub 36 to flap. Springs 112 and flyballs 33 are selected so that flap locks 110 and 110' lock the blades below 25% normal r.p.m. and free the blades above that r.p.m.

Figure 13:
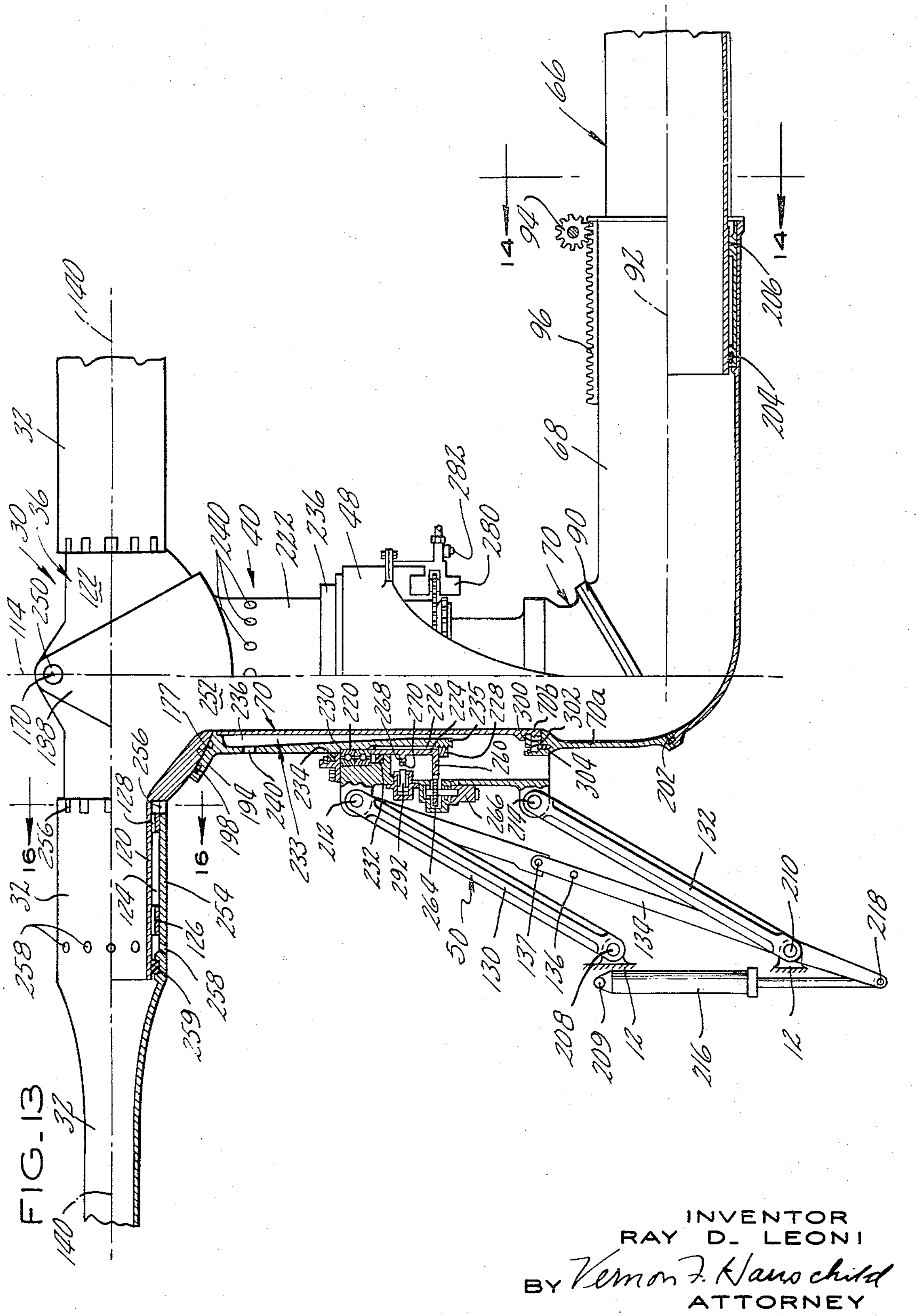
FIG. 13 is an enlarged side view of my helicopter lift rotor and its associated ducting, with portions removed to illustrate the rotor retraction, braking and positioning mechanisms.

Referring to FIG. 13 it will be noted that blades 32 sleeve onto diametrically opposed spindles 120 and 122 which project from cylinder hub 36 and form annular cavity 124 therebetween and in which stacked bearings 126 and 128 are positioned.

Figure 5:
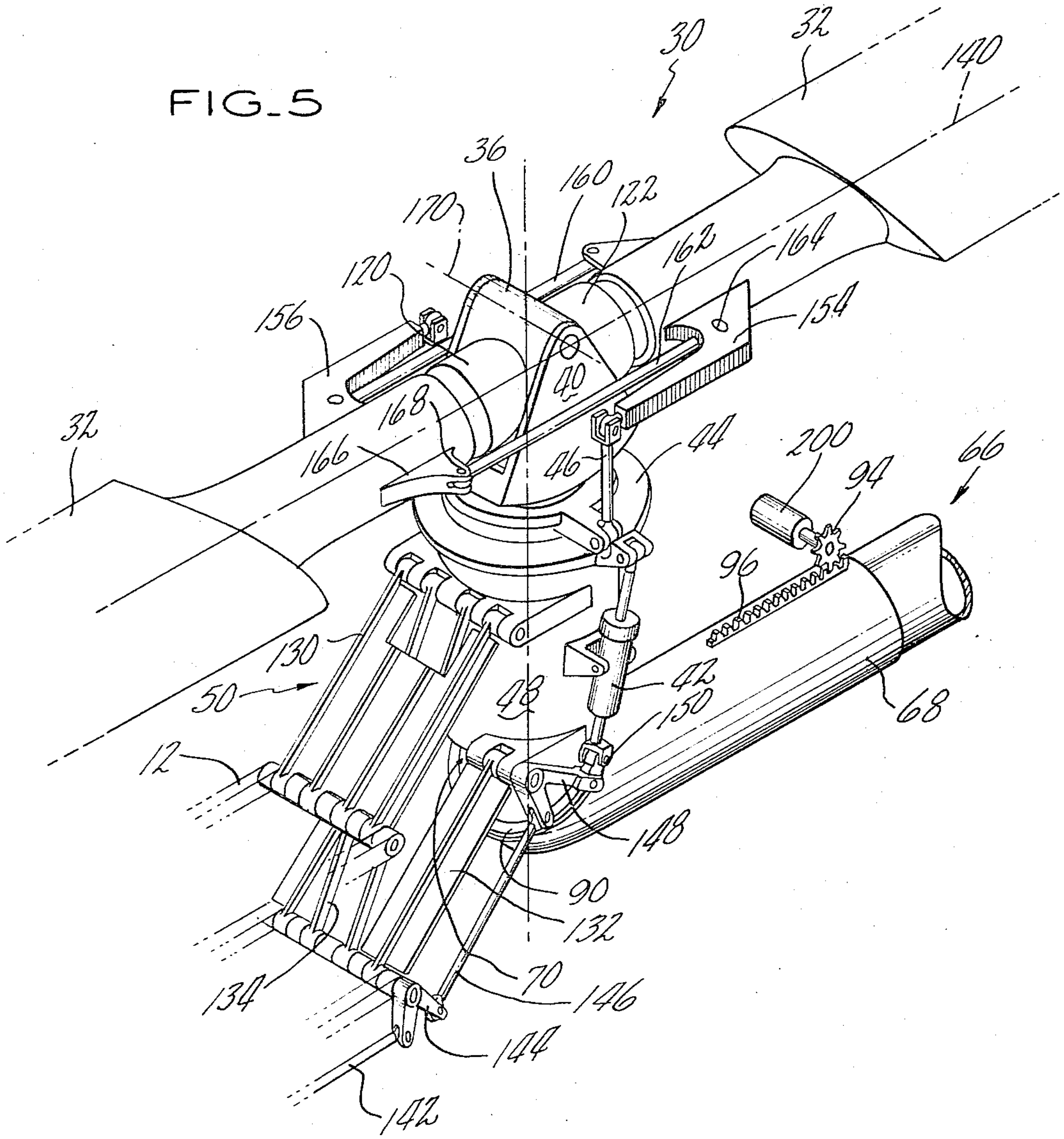
FIG. 5 is a perspective showing of the helicopter rotor and its associated ducting in the extended position or helicopter mode.
Figure 6:
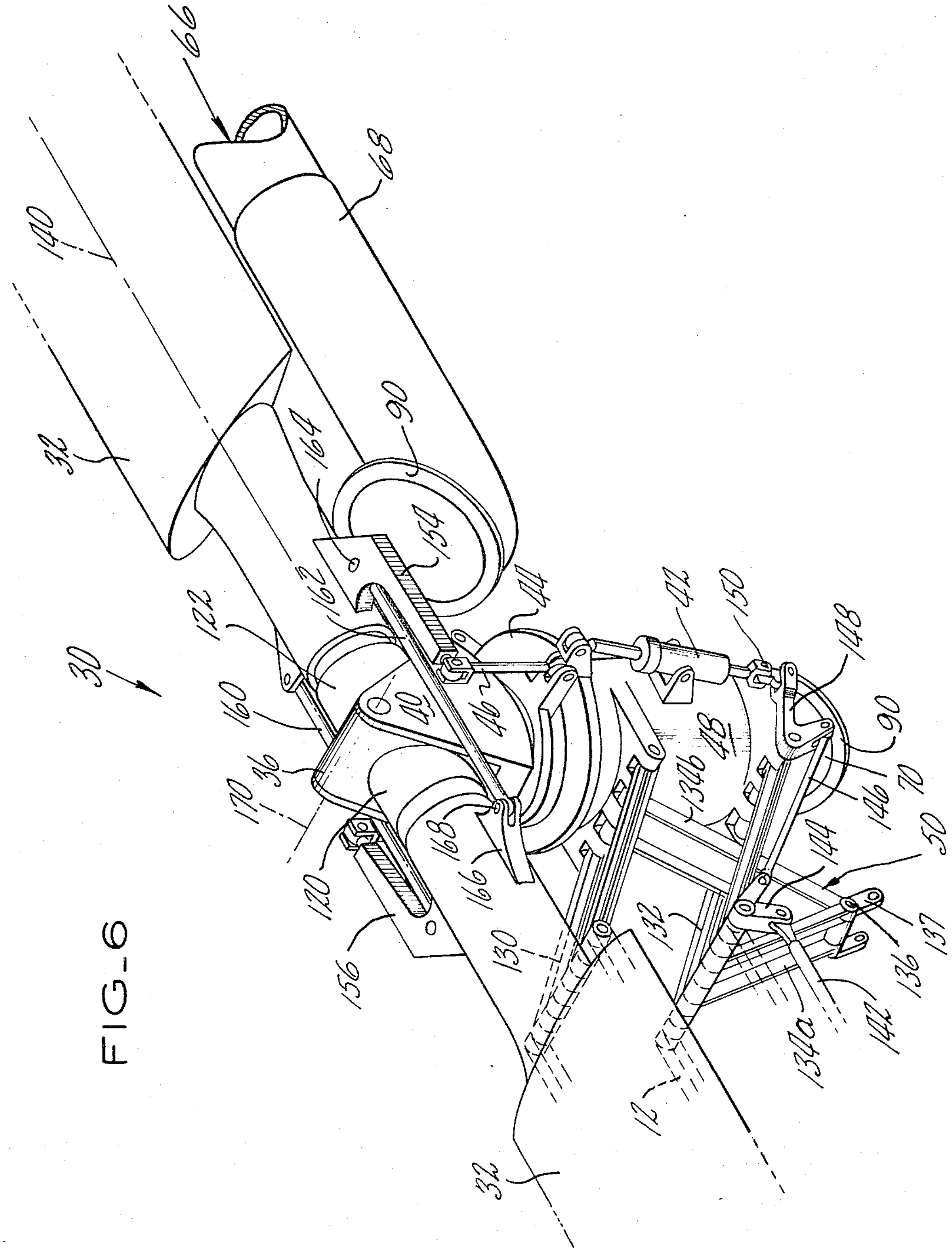
FIG. 6 is a perspective showing of my helicopter rotor and its associated ducting in its stowed position or fixed wing mode.

Referring to FIGS. 5 and 6 we see a schematic representation of my lift rotor 30 and its associated ducting in the extended and stowed positions, respectively. FIG. 5 shows my tilt rotor 30 in its extended position for helicopter mode of operation. With rotor 30 in the FIG. 5 position, the exhaust gases from engine 52 pass through duct system 66, including telescoping, horizontal duct 68, then through flange joint 90 into vertical duct 70, then through trunnion support member 40, hub 36, spindles 120 and 122 and blades 32 to be discharged to atmosphere through blade tip nozzles 34 (FIG. 3). Nozzles 34 may be of the type taught in U.S. Patent No. 2,989,268 and may be variable area as in U.S. Patent No. 2,667,226.

Rotor support housing 48 is supported from fuselage 12 by stowing members 50 which include top link members or struts 130 which are pivotally attached to support housing 48 and fuselage 12, bottom link members or struts 132, which are also pivotally attached to support housing 48 and fuselage 12 and central support members or struts 134, which are of two-piece construction with the opposite ends 134a and 134b pivotally joined to support housing 48 and fuselage 12 and to each other. When the central members 134 are unlocked at lock 137 (FIG. 17), to free central pivot point 136, they pivot as shown in FIG. 6 so that members 134a and 134b permit stowing members 130 and 132 to pivot about fuselage 12 and lower rotor 30 into the fuselage. Rotor 30 is not lowered until after telescoping horizontal duct 68 is retracted to its FIG. 6 position.

As previously described, helicopter blades 32 are sleeved onto hub spindles 120 and 122 with stacked bearings 126 and 128 therebetween. Accordingly, as best shown in FIGS. 5 and 6, blades 32 are free to change pitch by rotating about feathering axis 140. This pitch change is brought about in conventional fashion when pilot control rod 142 causes bell crank 144 to pivot and move rod 146 so as to pivot bell crank 148 and move rod system 150 so that control servos 42 (there are three such systems in conventional fashion) causes swash plate 44 to move control rods 46 and thereby move pitch control horns 154 and 156 to cause helicopter blades 32 to rotate about feathering axis 140 and hence change pitch. U.S. Patent No. 3,050,277 shows greater particulars regarding this control rod-bell crank system. The mechanism whereby the pilot actuates rod 142 of FIG. 5 is of conventional design and forms no part of this invention, but is fully described in U.S. Patent No. 3,109,496 and U.S. Patent No. 3,199,601.

Still referring to FIGS. 5 and 6 it will be noted that tension straps 160 and 162 extend between and are pivotally attached to each blade 32. For example, tension strap 162 is pivotally attached to pitch control horn 154 at pivot point 164 and is pivotally attached to lug 166 at pivot point 168. These straps 160 and 162 carry all centrifugal loads of the blades 32 so that loads placed on spindles 120 and 122 or bearings 126 and 128 are limited to lift loads. In addition, these straps, due to their blade-to-blade connection, receive no sinusoidal torsional loading from cyclic pitch variations as would be the case in a blade-to-hub connection. Therefore, the fatigue problem that would be created by cyclic flexing of the straps is eliminated. The only torsional loading imparted to the straps is that caused by the generally constant twist of collective pitch.

Still referring to FIGS. 5 and 6, it will be noted that blades 32 and central hub 36 are pivotally attached about flapping axis 170 to trunnion support member 40 so that lift rotor 30 is of the teeter-type.

Figure 7:
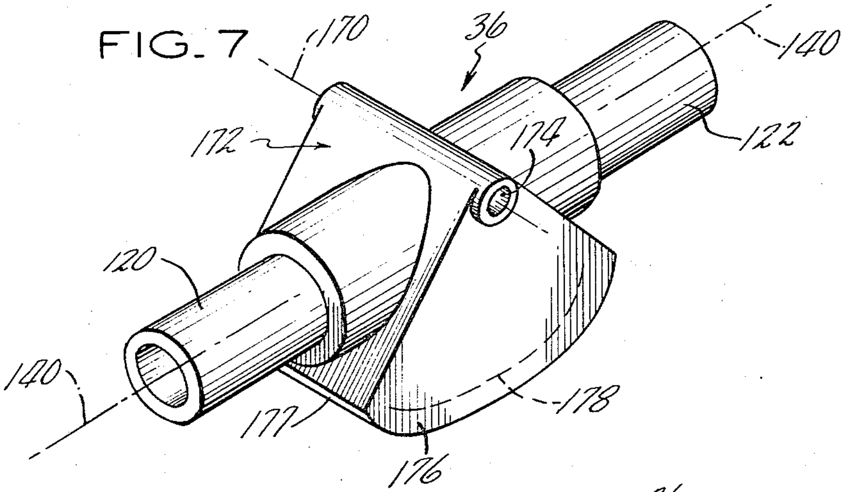
FIG. 7 is a perspective showing of the central hub of my helicopter rotor.
Figure 8:
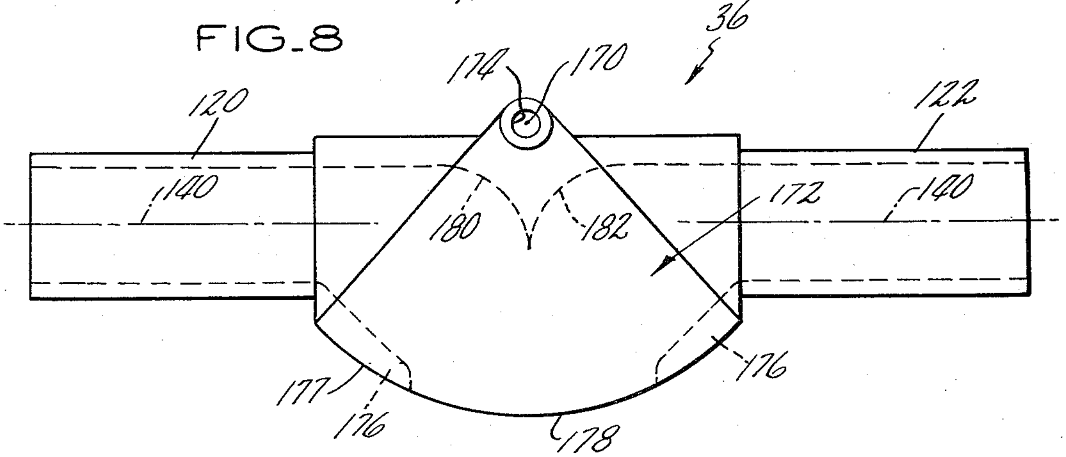
FIG. 8 is a side view of the central hub of my helicopter rotor.
Figure 9:
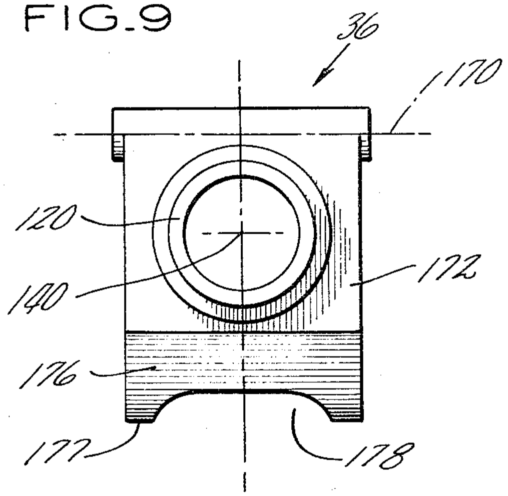
FIG. 9 is an end view corresponding to FIGS. 7 and 8.

Referring to FIGS. 7–9 we see my central support hub 36 of lift rotor 30 in greater particularity. Central hub 36 includes central member 172 which has pivot or hinge aperture 174 extending therethrough and running along flapping axis 170. Contoured seat section 176 has contoured surface 177 which is shaped to cooperate with a similar surface in trunnion support member 40 and includes gas flow aperture 178. Central hub 36 is preferably of one-piece construction with diametrically opposed spindles 120 and 122, which are concentric about feathering axis 140, projecting laterally from central member 172 so that the exhaust gases from engine 52 pass through aperture 178, central portion 172 and spindles 120 and 122 for distribution into blades 32. Central hub 36 is preferably contoured internally as shown along surfaces 180 and 182 to smoothly guide the gases passing through aperture 178 in entering spindles 120 and 122.

Figure 10:
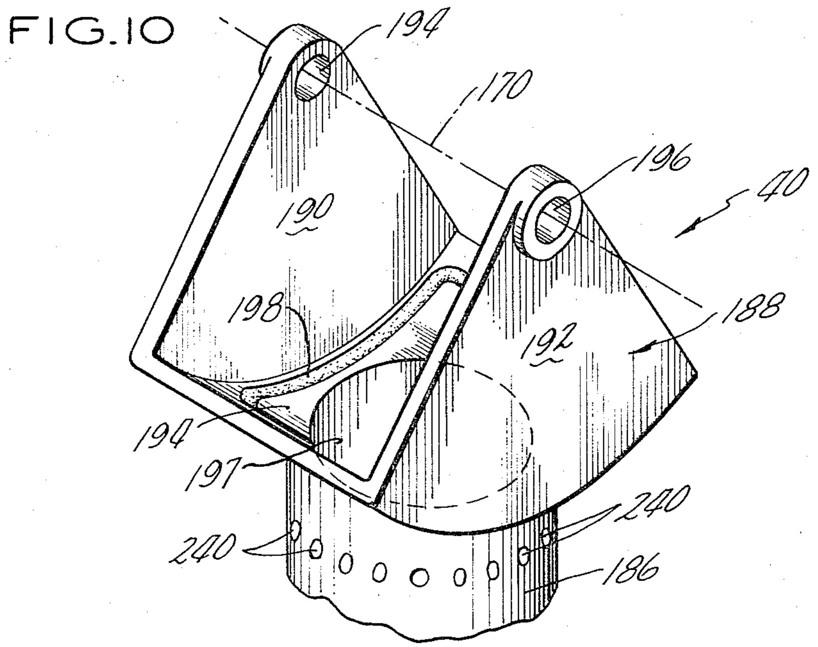
FIG. 10 is a perspective showing of the trunnion support member of my helicopter rotor.
Figure 11:
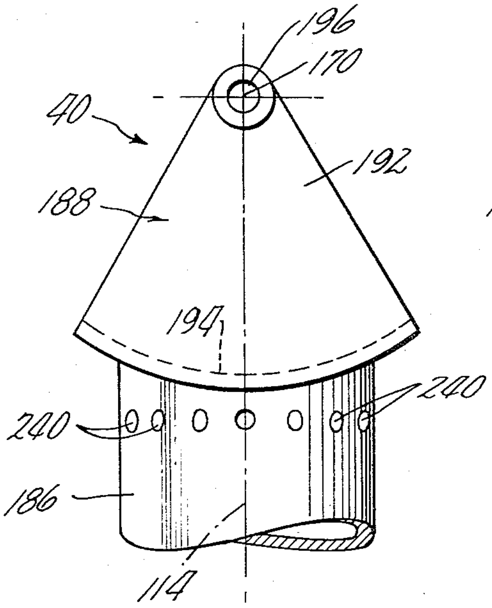
FIG. 11 is a side view of the trunnion support member of my helicopter rotor.
Figure 12:
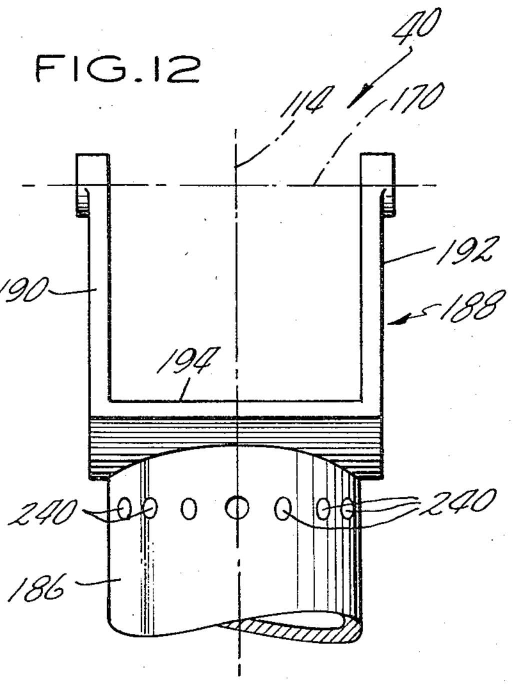
FIG. 12 is an end view corresponding to FIGS. 10 and 11.

Referring to FIGS. 10–12, we see my trunnion support member 40 in greater particularity. Trunnion support member 40 includes central support member 186, which is concentric about rotor axis 114 and has yoke-shaped end 188 with spaced plate members 190 and 192 which include aligned apertures 194 and 196 which are concentric about flapping axis 170. Yoke end 188 also includes seat member 194 which is contoured so as to sealably engage contoured surface 177 of central hub 36 and which includes aperture 197 therein. Seal member 198 extends around the periphery of contoured seat member 194 and is adapted to bear against contoured surface 177 of central hub 36.

Figure 14:
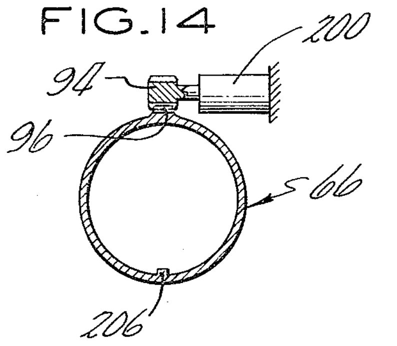
FIG. 14 is a view taken along line 14—14 of FIG. 13.
Figure 16:
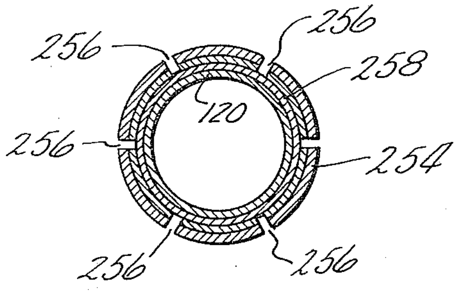
FIG. 16 is a view taken along line 16—16 of FIG. 13.

Referring to FIG. 13 we see lift rotor 30 and its associated ducting in greater particularity. It will be noted that duct system 66 includes horizontal, reciprocating duct section 68, which slides thereover in telescoping fashion. Pinion 94 is driven by any convenient mechanism such as electrical motor 200 (see FIGS. 14 and 15) and coacts with rack 96 to cause horizontal duct section 68 to move either forward or aft along horizontal axis 92 between a first position wherein it contacts vertical duct section 70 at mating flanges 90 and is sealed thereagainst by carbon seal rings 202, and a second position, shown in phantom in FIG. 3, wherein horizontal duct 68 translates along axis 92 in telescoping fashion and becomes separated from vertical duct 70 and the rotor axis 114 to provide clearance so that lift rotor 30 may be lowered into the fuselage by stowing members 50. Sliding seals 204 serve to seal between horizontal duct 68 and the remainder of duct system 66, and dog and slot arrangement 206 coact between movable duct 68 and stationary duct 66 to prevent the rotation of duct 68 about axis 92 as it translates therealong.

Still referring to FIG. 13 it will be noted that stowing member 50 is pivotally attached to fuselage 12 at pivot points 208 and 210 and is pivotally attached to rotor support housing 48 at pivot points 212 and 214. Accordingly it will be seen, that with horizontal duct 68 displaced aft, and with lock pin 137 unlocked in central member 134 of stowing member 50, hydraulic cylinder-piston arrangement 216, which is pivotally attached to central strut 134 at pivot point 218 and to fuselage 12 at 209 can be actuated to cause upper struts 130 and lower struts 132 of stowing member 50 to pivot in a clockwise direction around pivot points 208 and 210, respectively, thereby lowering rotor support housing 48 and hence rotor 30 into its stowed position within the fuselage 12.

Bearings 220 are positioned between stationary support housing 48 and the central portion 222 of trunnion support member 40 so that trunnion support member 40 and hence blade central hub 36 and blade 32 are supported by housing 48 for rotation about rotational axis 114. Braking and positioning sleeve 224, which will be described in greater particularity hereinafter, envelops the central substantially cylindrical portion 222 of trunnion support member 40 and is preferably splined thereto by splines 226 and is prevented from being sleeved therefrom by nut 228. Nut 228 is threaded to trunnion support member 40 and abuts sleeve 224 which in turn abuts and positions bearings 220 against shoulder 230 of trunnion member 40, thereby positively connecting support housing 48 and trunnion member 40 in load carrying fashion. Circumferential seals 232 and 234, the latter of which is supported by flange member 236, serve to seal between housing 48 and support member 40 on the opposite sides of bearing 220.

It will be noted in FIG. 13 that central portion 222 of trunnion support member 40 is positioned substantially concentrically about rotational axis 114 and that it has a tapering inner wall which coacts with vertical duct member 70 to define a centrifugal air pump 223 which is of annular cross section and which is of minimum area at its bottom end 235 and maximum area at its top end 236 so that, as rotor 30 rotates, cooling air is pumped in through narrow end 235 of centrifugal air pump 233 and out apertures 240 in the wall of trunnion support member 40.

FIG. 13 also illustrates that the yoke end 188 of trunnion support member 40 receives and supports central hub member 36 in teeter fashion as pivot pin 250 passes through the aligned apertures 174, 194 and 196 (shown in FIGS. 7, 8, 10 and 11) along flapping axis 170. Contoured seat surface 194 of trunnion support 40 mates in sealing fashion with contoured seat surface 177 of central hub 36 so that aperture 197 of trunnion support member 40 (FIG. 10) and aperture 178 of central hub 36 (FIG. 7) cooperate to define gas flow passage 252.

Still referring to FIG. 13 it is noted that blade 32 has sleeve 254 at its root end which sleeves over spindle 120 in spaced relation so as to define annular aperture 124 therebetween. Bearings 126 and 128 are positioned between spindle 120 and sleeve 254 so that blade 32 is mounted to rotate about spindle 120 and feathering axis 140 in pitch change fashion. Bearings 126 and 128 are of conventional design and preferably ball bearings. Circumferential seal 259 seals between blade 32 and spindle 120. Provisions are made to cool bearings 126 and 128 by providing a plurality of circumferentially positioned apertures 256 in sleeve 254 and bearing 128 and providing a second series of circumferentially positioned apertures 258 in sleeve 254 so that cooling air will be pumped by centrifugal force through apertures 256, annular cavity 124 and apertures 258 to cool bearings 126 and 128. It will be understood that spindle 122 is joined to the other blade 32 in the same fashion.

Carbon seal rings 300 and 302 are loaded by spring 304 and seal between the stationary portion 70a and the rotating portion 70b of vertical duct 70.

Figure 15:
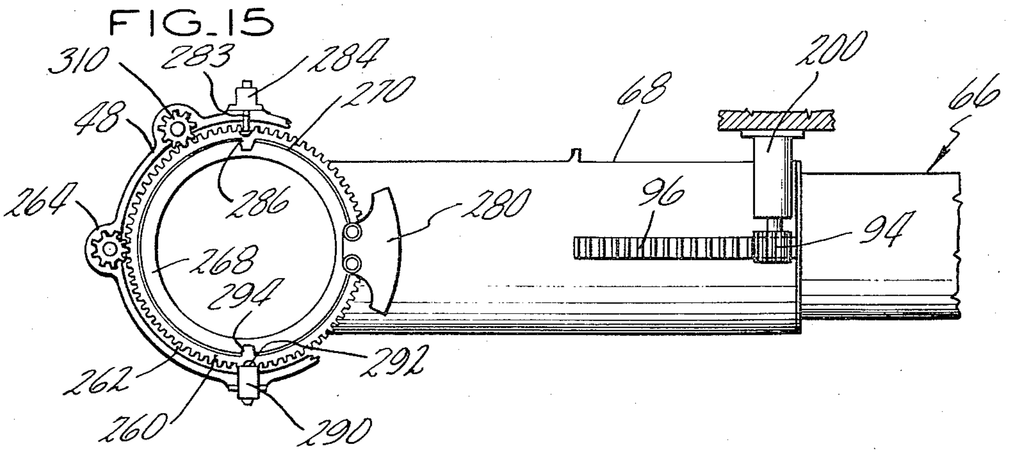
FIG. 15 is a top view corresponding to FIG. 13 with the rotor and support housing removed to illustrate the rotor braking and positioning mechanism.
Figure 17:
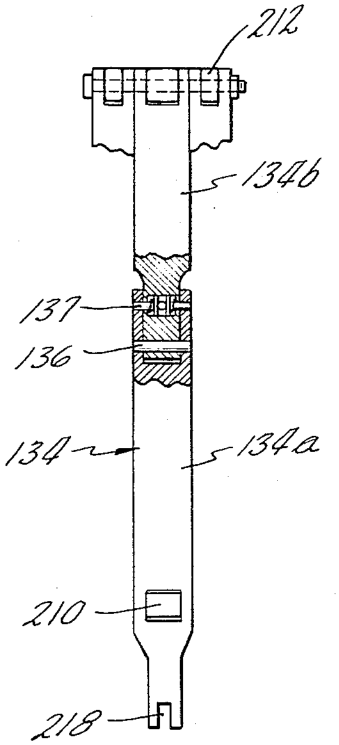
FIG. 17 is a view of the central pivotal strut of my helicopter rotor stowing member.

To permit the stowage of rotor 30 within fuselage 12 as shown in phantom in FIG. 3, it is necessary that rotor blades 32 extend in a fore-and-aft direction of convertiplane 10. Mechanism for this rotor positioning function is illustrated in FIGS. 13, 15 and 17 and will now be described. Sequencing mechanism forms no part of this invention and hence no description thereof is included. Referring to FIGS. 13 and 15, it will be noted that sleeve member 224 has circumferential brake disc or flange 260, which has peripheral teeth 262 engaging tachometer gear 264, which is in turn connected to rotor speed sensing tachometer 266. Sleeve 224 also has circumferentially extending rotor positioning flange 268 extending therefrom which flange carries interrupted slip ring 270 around the periphery thereof. Conventional disc-type brake 280 is carried by support housing 48 and includes hydraulically actuated pucks adapted to engage braking flange or disc 260 so as to brake the rotation of rotor 30. Brake 280 is actuated by hydraulic valve 282 which is preferably of the type capable of exerting partial braking pressure, then full braking pressure when so actuated.

When convertiplane 10 is in helicopter mode and the pilot wishes to go to fixed wing mode, he first unloads rotor 30 by decreasing the blade collective pitch and attaining a nose high attitude to increase the angle of attack of the fixed wings. The pilot holds air speed by actuating diverter valves 60 to the position shown in phantom in FIG. 3 to channel exhaust gases from engine 52 to exhaust nozzle 56. The pilot then decelerates the helicopter rotor 30 to approximately 25% normal r.p.m. by applying proper collective and cyclic pitch to produce an aerodynamic decelerating torque or load without aerodynamic lift. At about 25% normal r.p.m., the brake 280 is actuated at partial braking pressure by valve 282. The brake may be actuated by the pilot, or tachometer 266 could send a signal to valve 282 which would direct partial braking pressure to the pucks of brake 280. When the rotor 30 reaches about 1% normal r.p.m. either the pilot or tachometer 266 may energize the circuitry to switch 284 (FIG. 15). Plunger 283 of switch 284 contacts interrupted slip ring 270, the interruptions of which may be aligned 90° to the blade span axis, (FIG. 15) and when plunger 283 senses the slip ring gap, such as 286 or 294, the switch 284 sends an electrical signal to brake valve 282 to apply full braking pressure to the brake 280 to thereby stop rotor 30. Rotor 30 will stop essentially along the longitudinal or fore-and-aft axis of convertiplane 10. Tachometer 266 senses the stopped rotor and sends a signal to valve 282 to release brake 280 and to piston 290 for final blade positioning. Final accurate positioning or alignment is provided when contoured plunger 292 of hydraulic piston 290 is caused to extend and be received in accurately contoured slots at gaps 294 or 286 in positioning flange 268. Solenoid 284 and piston 290 are shown displaced 90° in FIG. 15. Rotor 30 is now locked in a precise fore-and-aft direction and is ready for stowing. While a dual pressure hydraulic valve has been used in conjunction with a brake and positioning plunger to accurately align the rotor for stowing, it will be easily understood that the rotor could be stopped in any position and accurately aligned by any means such as a motor driven pinion 310 (FIG. 15) or by aerodynamic forces on the rotor. Electric motor 200 is then actuated to cause pinion 94 and rack 96 to retract horizontal duct 68 to its phantom FIG. 3 position. When duct 68 is fully retracted, the pilot may send an electric signal to disconnect hydraulic pin 137 of central strut 134 of stowing member 50. Hydraulic cylinder 216 (FIG. 13) is then actuated to cause stowing member 50 to assume its FIG. 6 position and thereby stow rotor 30 on top of or within fuselage 12. If rotor 30 is stored within the fuselage, doors 22 may then be closed and the convertiplane 10 is in the FIG. 1 fixed-wing mode of operation.

Figure 18:
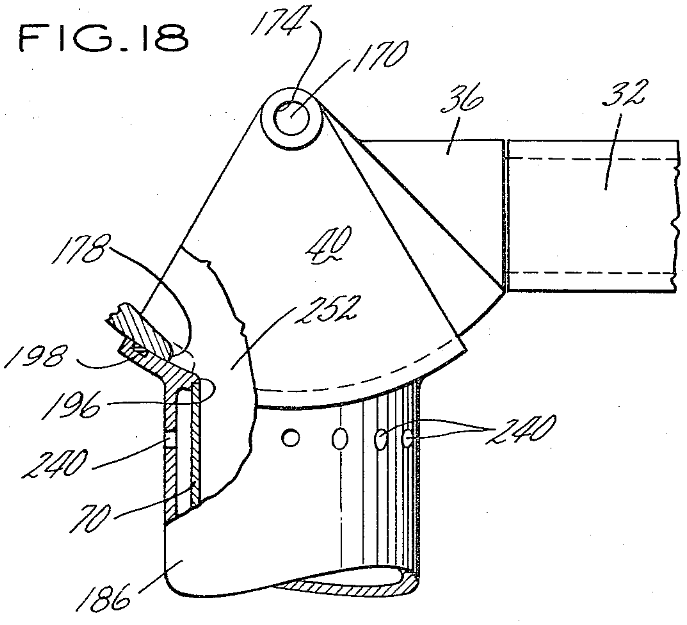
FIGS. 18 and 19 are alternate constructions of my helicopter rotor head to illustrate how a constant diameter gas-flow aperture is maintained in spite of blade flapping action.
Figure 19:
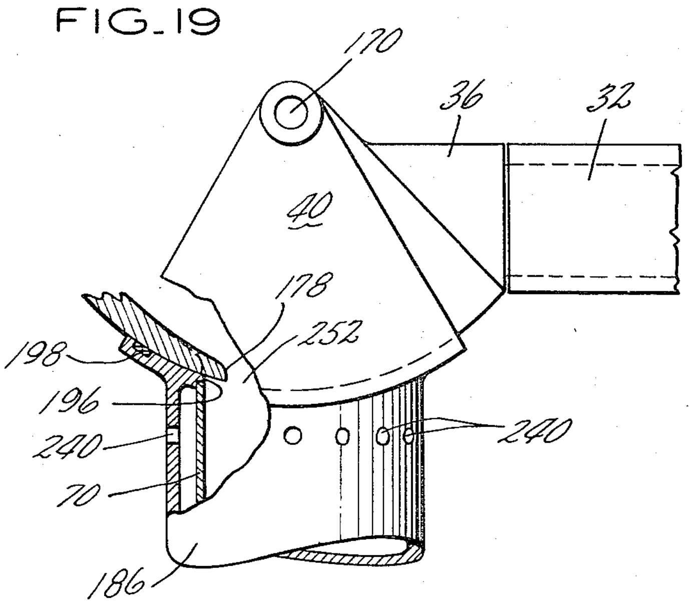

As best shown in FIGS. 18 and 19, gas-flow aperture 252 formed between trunnion support member 40 and central blade hub 36 can be made to be of constant cross-sectional area. As shown in FIG. 18, the aperture 178 of central hub 36 is enough larger than aperture 196 of support member 40 that as hub 36 pivots in teeter fashion about flapping axis 170, aperture 178 moves between its FIG. 18 solid and phantom line positions so that trunnion support aperture 196 is actually determining the size of gas-flow aperture 252 at all times.

Conversely, if aperture 178 of central hub 36 is made sufficiently smaller than aperture 196 of trunnion support 40, so that, as central support 36 pivots in teeter fashion about flapping axis 170, aperture 178 moves between its solid and phantom FIG. 19 positions, gas-flow passage 252 will always be of constant cross-sectional area since it is always determined by aperture 178.

It is to be understood that the invention is not limited to the specific embodiment herein illustrated and described but may be used in other ways without departure from its spirit as defined by the following claims.

I claim:

1. A convertiplane including a fuselage, a jet type engine mounted in said fuselage and adapted to discharge exhaust gases rearwardly to generate thrust, an extensible, retractable two-bladed lift rotor projecting from said fuselage including a rotatably mounted blade support member having two diametrically opposed rotor spindles projecting therefrom, rotor blades sleeved onto said spindles for rotation therewith, means connecting said engine to said lift rotor so that said lift rotor is driven by said engine, flap locks mounted for rotation with said blade support member and spring loaded to engage said blades to lock said blades from flapping with respect to said blade support member when the lift rotor is not rotating and centrifugally actuatable to unlock said blades from said blade support member and stowage linkage pivotally connecting said blade support member to said fuselage, and means to actuate said stowage linkage to extend and retract said blade support member with respect to said fuselage.

2. A convertiplane including a fuselage, a jet type engine mounted in said fuselage and adapted to discharge exhaust gases rearwardly to generate thrust, an extensible, retractable two-bladed lift rotor projecting from said fuselage including a rotatably mounted blade support member having two diametrically opposed rotor spindles projecting therefrom, rotor blades sleeved onto said spindles for rotation therewith and thereabout, means connecting said engine to said lift rotor so that said lift rotor is driven by said engine, flap locks mounted for rotation with said blade support member and spring loaded to engage said blades to lock said blades from flapping with respect to said blade support member when the lift rotor is not rotating and centrifugally actuatable to unlock said blades from said blade support member, tension torsion straps extending between and directly connecting said blades and stowage linkage pivotally connecting said blade support member to said fuselage, and means to actuate said stowage linkage to extend and retract said blade support member with respect to said fuselage.

3. A convertiplane including a fuselage, a jet type engine mounted in said fuselage and adapted to discharge exhaust gases rearwardly to generate thrust, an extensible retractable two-bladed lift rotor projecting from said fuselage including a rotatably mounted blade support member having two diametrically opposed rotor spindles projecting therefrom, rotor blades sleeved onto said spindles for rotation therewith and thereabout, means connecting said engine to said lift rotor so that said lift rotor is driven by said engine, tension torsion straps extending between and directly connecting said blades and stowage linkage pivotally connecting said blade support member to said fuselage, and means to actuate said stowage linkage to extend and retract said blade support member with respect to said fuselage.

4. In a convertiplate operable both in fixed winged mode and helicopter mode including:

(a) a fuselage having a forward end, a rearward end, top and bottom, and a horizontal and a vertical axis, (b) a jet type engine mounted in said fuselage, (c) first duct means connected to said engine and oriented to discharge the exhaust gases therefrom rearwardly from said fuselage to generate forward thrust, (d) fixed wings projecting from said fuselage, (e) a helicopter lift rotor projecting vertically in an extended position from the top of said fuselage and including a vertically extending, hollow rotatably mounted blade support member mounted to be rotatable about a vertical axis and having two hollow diametrically opposed blade support spindles projecting substantially horizontally therefrom, (f) two hollow blades sleeved onto said spindles for rotation therewith and having gas exhaust nozzles in the tips thereof oriented to cause blade rotation when gas is exhausted therethrough, (g) second duct means joining said engine to said blade support member and blades and including a horizontal duct section detachably joined to a vertical duct section which is joined to said blade support member and which horizontal duct section is translatable between a first position in which it joins to said vertical duct section and a second position wherein said horizontal and vertical duct sections are separated, (h) means to retract said helicopter lift rotor into a stowed position in said fuselage when said horizontal duct section is in said second position, (i) and means to direct the exhaust gases from said engine through said first duct to generate forward thrust when said helicopter lift rotor is in said stowed position and said horizontal duct is in said second position so that said convertiplate is operating in fixed wing mode, (j) and means to direct said exhaust gases through said second duct means, said blade support member, said rotor blades and said exhaust nozzles to rotate said helicopter lift rotor when said helicopter lift rotor is in said extended position and said horizontal duct is in said first position so that said convertiplate is operating in helicopter mode.

5. Apparatus according to claim 4 and including two tension support straps positioned on opposite sides of said blade support member and jointed to said blades to connect said blades directly.

6. Apparatus according to claim 4 and including flap locks pivotally connected to said blade support member for rotation therewith and being spring loaded to pivot and engage said blades to lock said blades from flapping with respect to said blade support member when said lift rotor is not rotating and being centrifugally actuatable to unlock said blades from said blade support member.

7. Apparatus according to claim 6 wherein said blades are sleeved onto said spindles in spaced relation to define an annular aperture therebetween, bearing means positioned in said annular aperture to support said blades from said spindles for blade pitch-change rotation thereabouts, and means responsive to blade rotation to cool said bearing means.

8. A flight vehicle including:

(a) a fuselage, (b) a jet type engine mounted in said fuselage and adapted to discharge exhaust gases rearwardly to generate thrust, (c) a two-bladed lift rotor projecting from said fuselage including:

(1) a rotatably mounted trunnion member projecting substantially vertically from said fuselage and including a hollow central portion and a trunnion yoke with a contoured seat member adjacent said central portion, (2) a one-piece blade hub pivotally attached to said trunnion yoke to pivot therewithin in teeter fashion and including a seat portion contoured to sealably engage said trunnion yoke seat member and having an aperture therein communicating with said hollow central portion of said trunnion member, said blade hub further including diametrically opposed spindle arms projecting therefrom, (3) hollow rotor blades sleeve onto said spindle arms for rotation therewith and having selectively directed nozzles in the tips thereof, (d) and duct means connecting said engine to said lift rotor so that said lift rotor is driven by said engine as engine exhaust gases pass sequentially through said duct means, said trunnion member, said hub, said blades and said nozzles.

9. A flight vehicle including:

(a) a fuselage, (b) a jet type engine mounted in said fuselage and adapted to discharge exhaust gases rearwardly to generate thrust, (c) a two-bladed lift rotor projecting from said fuselage including:

(1) a rotatably mounted trunion member projecting substantially vertically from said fuselage and including a hollow central portion and a trunnion yoke with a contoured seat member adjacent said central portion, (2) a one-piece blade hub pivotally attached to said trunnion yoke to pivot therewithin in teeter fashion and including a seat portion contoured to sealably engage said trunnion yoke seat member and having an aperture therein communicating with said hollow central portion of said trunnion member, said blade hub further including diametrically opposed spindle arms projecting therefrom, (3) hollow rotor blades sleeve onto said spindle arms for rotation therewith and having selectively directed nozzles in the tips thereof, (d) duct means connecting said engine to said lift rotor so that said lift rotor is driven by said engine as engine exhaust gases pass sequentially through said duct means, said trunnion member, said hub, said blades and said nozzles, (e) and flap locks mounted for rotation with said trunnion member and spring loaded to engage said blades to lock said blades and said hub with respect to said trunnion member when the lift rotor is not rotating and centrifugally actuatable to unlock said blades and hub from said trunnion member.

10. A flight vehicle including:

(a) a fuselage, (b) a jet type engine mounted in said fuselage and adapted to discharge exhaust gases rearwardly to generate thrust, (c) a two-bladed lift rotor projecting from said fuselage including:

(1) a rotatably mounted trunnion member projecting substantially vertically from said fuselage and including a hollow central portion and a trunnion yoke with a contoured seat member adjacent said central portion, (2) a one-piece blade hub pivotally attached to said trunnion yoke to pivot therewithin in teeter fashion and including a seat portion contoured to sealably engage said trunnion yoke seat member and having an aperture therein communicating with said hollow central portion of said trunnion member, said blade hub further including diametrically opposed spindle arms projecting therefrom, (3) hollow rotor blades sleeved onto said spindle arms for rotation therewith and having selectively directed nozzles in the tips thereof, (d) duct means connecting said engine to said lift rotor so that said lift rotor is driven by said engine as engine exhaust gases pass sequentially through said duct means, said trunnion member, said hub, said blades and said nozzles, (e) flap locks mounted for rotation with said trunnion member and spring loaded to engage said blades to lock said blades and said hub with respect to said trunnion member when the lift rotor is not rotating and centrifugally actuatable to unlock said blades and hub from said trunnion member, (f) and tension torsion straps extending between and directly connecting said blades.

11. A flight vehicle including:

(a) a fuselage, (b) a jet type engine mounted in said fuselage and adapted to discharge exhaust gases rearwardly to generate thrust, (c) a two-bladed lift rotor projecting from said fuselage including:

(1) a rotatably mounted trunnion member projecting substantially vertically from said fuselage and including a hollow central portion and a trunnion yoke with a contoured seat member adjacent said central portion, (2) a one-piece blade hub pivotally attached to said trunnion yoke to pivot therewithin in teeter fashion and including a seat portion contoured to sealably engage said trunnion yoke seat member and having an aperture therein communicating with said hollow central portion of said trunnion member, said blade hub further including diametrically opposed spindle arms projecting therefrom, (3) hollow rotor blades sleeved onto said spindle arms for rotation therewith and having selectively directed nozzles in the tips thereof, (d) duct means connecting said engine to said lift rotor so that said lift rotor is driven by said engine as engine exhaust gases pass sequentially through said duct means, said trunnion member, said hub, said blades and said nozzles, (e) flap locks mounted for rotation with said trunnion member and spring loaded to engage said blades to lock said blades and said hub with respect to said trunnion member when the lift rotor is not rotating and centrifugally actuatable to unlock said blades and hub from said trunnion member, (f) tension torsion bars extending between and directly connecting said blades, (g) and means to selectively direct the exhaust gases from said engine either rearwardly to generate forward thrust or through said blades to generate lift.

12. In a convertiplane operable both in fixed winged mode and helicopter mode including:

(a) a fuselage having a forward end, a rearward end, top and bottom, and a horizontal and vertical axis, (b) a jet type engine mounted in said fuselage, (c) first duct means connected to said engine and oriented to discharge the exhaust gases therefrom rearwardly from said fuselage to generate forward thrust, (d) fixed wings projecting from said fuselage, (e) a helicopter lift rotor projecting vertically in an extended position from the top of said fuselage and including:

(1) a vertically extending rotatably mounted trunnion member including a hollow central member mounted to be rotatable about a vertical axis and also having a yoke shaped end projecting therefrom and including an aperture communicating with said hollow central portion and still further having a contoured seat section adjacent said aperture and, (2) a central hub member pivotally attached to said trunnion member yoke shaped end to be pivotable in teeter fashion therewithin and including an aperture aligning with said aperture in said trunnion member and having a seat section adjacent thereto sealably engaging said trunnion member seat section and still further having two hollow diametrically opposed blade support spindles projecting substantially horizontally therefrom, (3) two hollow blades sleeved onto said spindles for rotation therewith and having gas exhaust nozzles in the tips thereof oriented to cause blade rotation when gas is exhausted therethrough, (f) second duct means joining said engine to said trunnion member, hub and blades and including a horizontal duct section detachably joined to a vertical duct section which is joined to said trunnion member, hub and blades and which horizontal duct section is translatable between a first position in which it joins to said vertical duct section and a second position wherein said horizontal and vertical duct sections are separated, (g) means to retract said helicopter lift rotor into a stowed position in said fuselage when said horizontal duct section is in said second position, (h) and means to direct the exhaust gases from said engine through said first duct to generate forward thrust when said helicopter lift rotor is in said stowed position and said horizontal duct is in said second position so that said convertiplane is operating in fixed wing mode, (i) and means to direct said exhaust gases through said second duct means, said trunnion member, hub and blades and said exhaust nozzles to rotate said helicopter lift rotor when said helicopter lift rotor is in said extended position and said horizontal duct is in said first position so that said convertiplane is operating in helicopter mode.

13. Apparatus according to claim 12 and wherein said hub and trunnion member apertures are of selected size to define a passage of constant cross-sectional area therebetween as said hub teeters with respect to said trunnion member.

14. Apparatus according to claim 12 and including means to brake and accurately position said lift rotor when the convertiplane is changing from helicopter mode to fixed wing mode including pin means engaging a selectively sized aperture in said trunnion member.

15. Apparatus according to claim 12 wherein said vertical duct section passes through said trunnion member hollow central portion to define an annular aperture therebetween, and means to pass cooling air through said annular aperture.

16. Apparatus according to claim 12 and including laterally disposed yaw control nozzles at said fuselage rearward end and third duct means joining said engine to said yaw control nozzles.

17. A teeter-type, hot cycle helicopter rotor having an axis and comprising:

(a) a rotor support member rotatable about said axis and including a hollow, central member concentric about said axis and further including a yoke-shaped end and having a contoured seat defining an aperture therewithin, (b) a one-piece, hollow, central hub pivotally attached to said yoke-shaped end to pivot therewithin in teeter fashion and including diametrically opposite hollow spindles and a seat section contoured to sealably engage with said contoured seat of said central member and including an aperture positioned so that said apertures cooperate to define a gas-flow aperture, (c) and hollow blades sleeved onto said spindles and having selectively oriented exhaust nozzles in the tips thereof.

18. Apparatus according to claim 17 and including means to pass heated gases sequentially through said gas-flow aperture, said hub, said blades and said exhaust nozzles to cause said blades, hub and support member to rotate about said axis.

19. Apparatus according to claim 17 wherein said blades are sleeved onto said spindles in spaced relation to define an annular cavity therebetween, bearing means positioned within said annular cavity to support said blades from said spindles so that said blades may rotate in pitch-change fashion about said spindles, and means to cause said blades to change pitch.

20. Apparatus according to claim 19 and including means responsive to centrifugal force to cool said bearing means and said annular cavity.

21. Apparatus according to claim 17 wherein said hub aperture and said support member aperture are of selected size so that said gas-flow aperture is of constant cross-sectional area.

22. Apparatus according to claim 17 and including flap locks pivotally attached to and mounted for rotation with said rotor support member and spring biased to engage said blades to lock said hub and blades from flapping with respect to said rotor support member when said rotor support member is not rotating and centrifugally actuatable to unlock said hub and blades from said rotor support member.

23. Apparatus according to claim 17 and including at least one tension strap extending between and directly connecting said blades.

24. A helicopter rotor including blade support mechanism mounted for rotation about an axis and including a substantially cylindrical support member positioned concentrically about said axis, a support housing enveloping said support member in spaced relation thereto to define an annular cavity therebetween, bearing means positioned in said cavity between said support member and said support housing so that said support member is supported for rotation from said housing, a sleeve member sleeved onto said support member and connected thereto and including a radially projecting brake flange and a radially projecting rotor positioning flange having a positioning slot therein, brake means adapted to engage said rotor brake flange and thereby brake said rotor, and plunger means adapted to be received in said positioning slot to accurately position said rotor.

25. In a jet engine powered convertiplane adapted to operate either in helicopter mode wherein the jet engine exhaust gases drive the helicopter rotor or in jet airplane mode wherein the jet engine exhaust gases are discharged to atmosphere through an exhaust nozzle to generate thrust, the method of changing from helicopter mode to airplane mode comprising transferring lift load from the helicopter rotor to fixed wings, diverting the exhaust gases from driving the helicopter rotor to the jet engine thrust nozzles, varying the pitch of the helicopter blades both cyclically and collectively to induce aerodynamic drag without increasing aerodynamic lift thereon and hence reduce the speed of rotation of the helicopter rotor to about 25% normal r.p.m., then applying a light braking load to the helicopter rotor to reduce its speed to about 1% normal r.p.m., then applying a heavy braking load to said helicopter rotor to stop the rotor when the helicopter blades are in a preselected position, and then locking the helicopter rotor in the preselected position.

References Cited

UNITED STATES PATENTS

| | | | |
|---|---|---|---|
| 2,953,319 | 9/1960 | Gluhareff | 244—7 |
| 2,989,268 | 6/1961 | Andrews | 244—7 |
| 3,050,274 | 8/1962 | Haight | 244—7 |
| 3,231,222 | 1/1966 | Scheutzow | 170—160.51 |

MILTON BUCHLER, *Primary Examiner.*

ALFRED E. CORRIGAN, *Examiner.*

T. W. BUCKMAN, *Assistant Examiner.*